United States Patent
Gibson et al.

(10) Patent No.: US 10,432,693 B2
(45) Date of Patent: Oct. 1, 2019

(54) SYSTEM, METHOD AND COMPUTER PROGRAM FOR SIGNING AND DEDICATING INFORMATION OBJECTS

(75) Inventors: Thomas Matthew Mann Gibson, Toronto (CA); Martin John Warren, Toronto (CA); Boris Albert Koechlin, Whitby (CA); Ravi Dave, Toronto (CA)

(73) Assignee: SYNGRAFII INC., Toronto (CA)

( * ) Notice: Subject to any disclaimer, the term of this patent is extended or adjusted under 35 U.S.C. 154(b) by 884 days.

(21) Appl. No.: 13/812,166

(22) PCT Filed: Jul. 26, 2011

(86) PCT No.: PCT/CA2011/000885
§ 371 (c)(1),
(2), (4) Date: Jan. 25, 2013

(87) PCT Pub. No.: WO2012/012894
PCT Pub. Date: Feb. 2, 2012

(65) Prior Publication Data
US 2013/0132230 A1 May 23, 2013

Related U.S. Application Data

(60) Provisional application No. 61/367,719, filed on Jul. 26, 2010.

(51) Int. Cl.
*G06Q 30/00* (2012.01)
*H04L 29/08* (2006.01)
*G06Q 30/06* (2012.01)

(52) U.S. Cl.
CPC ......... *H04L 67/02* (2013.01); *G06Q 30/0627* (2013.01); *G06Q 30/0633* (2013.01); *H04L 67/22* (2013.01); *A63F 2300/575* (2013.01)

(58) Field of Classification Search
CPC ............ G06Q 30/0633; G06Q 30/0627; H04L 67/02; H04L 67/22; A63F 2300/575
See application file for complete search history.

(56) References Cited

U.S. PATENT DOCUMENTS 5,222,138 A 6/1993 Balabon et al.
6,381,344 B1 4/2002 Smithies et al.
(Continued)

FOREIGN PATENT DOCUMENTS

GB 2164186 A 3/1986
WO 2006056063 A2 6/2006

OTHER PUBLICATIONS

Lenz, Jörg (2011). Taking dynamic signatures seriously, Biometric Technology Today, vol. 2011, Issue 10, 2011, pp. 9-11, https://doi.org/10.1016/S0969-4765(12)70016-4. (http://www.sciencedirect.com/science/article/pii/S0969476512700164) (Year: 2011).*

(Continued)

*Primary Examiner* — Jason B Dunham
*Assistant Examiner* — Anand R Loharikar
(74) *Attorney, Agent, or Firm* — Norton Rose Fulbright Canada LLP

(57) ABSTRACT

A method is provided for enabling the signing/dedication of information objects including a celebrity accessing a signature/dedication queue of information objects, the celebrity, by operation of a signature/dedication utility associating a signature/dedication of the one or more information objects, and distributing the information object(s) to the intended buyer/recipient such that the system is operable to validate that the celebrity signed/dedicated the information object(s) delivered to the buyer/recipient. The system of the present invention includes a computer device associated with a celebrity for capturing his/her handwriting and a signature utility linked to the computer device and to a server computer, for presenting one or more information objects to the (Continued)

celebrity, and for each information object enabling the celebrity to create a signing/dedication of the information object, the signature utility associating the signing/dedication to the information object, and being operable to enable the validation that the celebrity signed/dedicated the particular information object.

20 Claims, 7 Drawing Sheets

(56) References Cited

U.S. PATENT DOCUMENTS

| | | | |
|---|---|---|---|
| 7,697,713 | B1 | 4/2010 | Verhoeven et al. |
| 2002/0156740 | A1* | 10/2002 | Kasahara ............... G06Q 30/02 705/52 |
| 2003/0001818 | A1 | 1/2003 | Katagiri et al. |
| 2003/0093678 | A1 | 5/2003 | Bowe et al. |
| 2006/0291699 | A1* | 12/2006 | Ogram ................... G06F 21/34 382/115 |
| 2009/0063991 | A1* | 3/2009 | Baron ................. H04L 12/1822 715/751 |
| 2010/0284033 | A1* | 11/2010 | Popovic ................. B43L 13/00 358/1.15 |
| 2011/0159854 | A1* | 6/2011 | Kedefors ................ H04L 51/16 455/414.1 |

OTHER PUBLICATIONS

Patent Cooperation Treaty Office, International Search Report and Written Opinion dated Oct. 25, 2011, issued on PCT Application No. PCT/CA2011/000885.

CIPO, Office Action for CA Application No. 2,806,607 dated Apr. 10, 2017.

WIPO, Office Action for CA Application No. 2,806,607 dated Mar. 28, 2019.

* cited by examiner

FIG. 5

SYSTEM, METHOD AND COMPUTER PROGRAM FOR SIGNING AND DEDICATING INFORMATION OBJECTS

FIELD OF THE INVENTION

This invention relates in general to technologies that enable one or more persons to interact remotely. This invention relates more particularly to technology that enables individuals or characters having a fan base and their fans to interact for the purpose of signings or dedications of "information objects" as explained below. In particular, the invention permits these signings or dedications between different locations.

BACKGROUND OF THE INVENTION

There are numerous situations in which an interactive signing or dedication between a signor or dedicator and at least one other person is desired. Individuals with a following come to mind, such as popular artists, media personalities, actors, politicians, corporate executives, athletes or other celebrities. There is a growing need for personalization through signing or dedication of aspects of virtual words (whether gaming worlds or social network worlds such as SECOND LIFE™)

An important purpose of signing and/or dedication is to create a personal connection between the signor or dedicator and the other person who is the buyer or recipient of a product or service that emanates from the signor or dedicator, or is being promoted by the signor or dedicator. For example, an author is promoting a book that she has written. An actor is promoting his latest movie. A band is promoting their latest album. A person involved in sports who may sign memorabilia such as images of athletes, sports programs or other promotional materials. An individual, personified with the invented personal characteristics of a character in a video game or social networking virtual world is contracted to promote the game or virtual world to its subscribers or followers. In either case the individual has a following (or is interested in building a following), and is referred to collectively in this disclosure as a "celebrity".

Increasingly, the products in question are no longer physical products but rather digital products such as e-books, electronic music files, movie downloads, data streams of musical content, e-art, digital photos, e-artifacts or handles used in video games or social networking virtual worlds, or other digital entertainment content (referred to collectively as "information objects" in this disclosure.

Sale/distribution of information objects has become widespread. Their sale/distribution has been made highly efficient, and accessibility thereto has expanded, through digital distribution technologies. Sales of music in the form of downloads of musical files, for example through the iTunes™ has been growing quickly. Accessibility to music files and management of musical libraries is becoming widespread using wireless handhelds, including through PUSHLIFE™. Similarly, the sale of e-books has been increasing rapidly, driven by several factors, mainly the market adoption of several devices either specifically designed for the viewing of e-books, such as the KINDLE™ by Amazon™, KOBO™ or the SONY READER™. The launch of the iPad™ has resulted in further acceleration of sales of e-books. Recently, iCloud™, and other Cloud related services make all of this digital content and items readily accessible virtually everywhere and on anything.

Despite the advantages of electronic distribution of entertainment content, the sale/distribution of such information objects is aided by enabling a human connection between the buyer/recipient and the celebrity, and this human connection is difficult to maintain in electronic distribution involving communications between computer devices and not humans. Distribution of traditional media such as books and music has shown the value of enabling personal interaction between celebrities and their fans. Personal interaction humanizes the celebrity, creates a sense of immediacy and connection in the fan toward the celebrity, which in turn inspires loyalty in the fan, makes the fan invested in the success of the celebrity and his/her products or services. The same is true for celebrities who promote the sale of products or services associated with their brand and persona.

The personal interaction for traditional media, practically, often takes the form of signings/dedications such as book signings, CD signings or signing of other memorabilia. These personal interactions help celebrities cultivate a likeable and accessible image and helps them promote their products/services or the products/services of others that they have endorsed. This type of accessibility increases the appeal of the celebrities who participate, even with those fans who do not take part in the signings/dedications themselves.

It is also noted that the market for originally signed articles for celebrities, for example, for sale at charity auctions, is a significant one. However, verifying the authenticity of such signed articles can be difficult and often signed articles are shown to be fabricated.

PCT/CA2005/001788, "System, Method And Computer Program For Enabling Signing And Dedications On A Remote Basis" (the "PCT Application"), which is marketed as "LONGPEN"™ enables the remote signing of physical articles such as paper books, CD covers, t-shirts and the like. The PCT Application describes the signature of physical articles by operation of a plotting apparatus, based on signature data collected using a remote computer a location remote from the plotting apparatus, and by means of transmission of signature data from the remote computer to the plotting apparatus or a computer linked to the plotting apparatus.

There is a need therefore for a system, computer program and method that addresses the aforesaid disadvantages. In particular, there is a need for a system, computer program and method that enables sale/distribution of information objects in a way that a connection is created between the buyer or recipient of the information object and a human being, the celebrity.

SUMMARY OF THE INVENTION

A system, method and computer program for enabling signings/dedications of information objects on a remote basis is provided.

In one aspect of the present invention, a computer network implemented method is provided for enabling the signature/dedication of information objects and distribution of signed/dedicated information objects, the method comprising: (1) a celebrity accessing a signature/dedication queue of information objects via a computer network connected device, (for example as a web page or as part of a computer program, whether implemented as a computer application or mobile application), (2) the celebrity, by operation of a signature/dedication utility associating a signature/dedication of the one or more information objects, which association is recorded by a server computer linked to the computer network connected device, and (3) initiating the distribution of the information object(s) to an intended buyer/recipient such that the server computer is operable to validate that the celebrity signed/dedicated the information object(s) delivered to the buyer/recipient.

As a further aspect of the present invention, the method includes the step of sending a request to a service provider server computer linked to the server computer, for initiating the creation of a digital product that includes the signature/dedication, and delivery of the signed/dedicated digital product to the intended buyer/recipient.

The system of the present invention comprises: a network connected computer device associated with a celebrity operable to capture his/her handwriting, and a signature/dedication utility linked to the network connected computer device and further linked to a network connected server computer, the signature/dedication utility being operable to present one or more information objects to the celebrity, and for each information object enabling the celebrity to create a signing/dedication of the information object, the signature utility further being operable to associate the signing/dedication to the information object so as to enable validation that the celebrity signed/dedicated the particular information object.

In another aspect of the invention a computer network implemented method for enabling the signing/dedication of information objects is provided, characterized in that the method comprises:

(a) one or more celebrities using a computer device to access a signature/dedication queue of information objects, and (b) the celebrity initiating a signature/dedication utility (i) to enable generation of a signature/dedication, and (ii) to link the signature/dedication to a particular information object in the queue such that the signature/dedication of a particular information object by the one or more celebrities may be validated by a server computer linked to the computer device.

In another aspect, the method further comprises associating with the signature/dedication one or more data items associated with an intended buyer/recipient for the particular information object; and the one or more celebrities using the one or more data items to dedicate the particular information object.

In yet another aspect of the invention the method comprises integrating the signature/dedication of the one or more information objects with audio-visual interactions between the one or more celebrities and one or more fans so as to present a computer network implemented event.

In a still other aspect, the method comprises further integrating computer network implemented social media interactions between the one or more fans in connection with the computer network implemented event.

In another aspect the method comprises the further step of enabling the intended buyer/recipient to order a physical version of the one or more information objects using an on-demand print service.

A computer network implemented system for enabling signing/dedication of information objects is provided, characterized in that the system comprises: a computer device associated with one or more celebrities that is operable to capture the handwriting of the one or more celebrities; the computer device being operable to link to a server computer that presents a queue of information objects for signature/dedication by the one or more celebrities for a fan, wherein the server computer is linked to a signature/dedication utility that enables the one or more celebrities to, using the computer device, (i) to generate a signature/dedication for the fan, and (ii) to link the signature/dedication to a particular information object in the queue such that the signature/dedication of a particular information object by the one or more celebrities may be validated.

In another aspect, the system is characterized in that the server computer includes or is linked to one or more hardware/software utilities that enable computer network implemented audio-video interactions between the one or more celebrities and one or more fans.

In another aspect, the audio-video interactions are linked to signature/dedication of information objects in connection with an online fan/celebrity event.

In a still other aspect, the system is operable to compile profile data for each fan, and the system is operable to present selected profile data to assist the one or more celebrities in interacting with the one or more fans in connection with the online fan/celebrity event.

In another aspect the system further includes or is linked to a computer network implemented social media engine that is operable to enable social media connections and interactions between fans in connection with the online fan/celebrity event.

In yet another aspect, the system includes or is linked to an on demand printing system that is operable to print products based on or associated with the information objects, wherein the system is operable to enable the one or more fans to order the print products using an electronic commerce utility that is included in or linked to the system.

In a still other aspect, the system includes or is linked to an activity logger that tracks and logs activities of one or more fans enabled by the system so as to produce activity data for the one or more fans, and the system further includes or is linked to an analytics engine that is operable to analyze the activity data so as to generate analytics data that supports analytical queries and/or report generation based on the analytics data.

In another aspect the analytical queries and/or reports relate to trends associated with information objects or one or more categories associated with information objects that reveal trends associated with interest in and/or consumption of content, including based on demographic data or location data.

BRIEF DESCRIPTION OF THE DRAWINGS

A detailed description of the preferred embodiment(s) is(are) provided herein below by way of example only and with reference to the following drawings, in which:

FIGS. 5 and 6 illustrate a representative web interface for signing/annotating an information objection that is an e-book.

Figure 1:
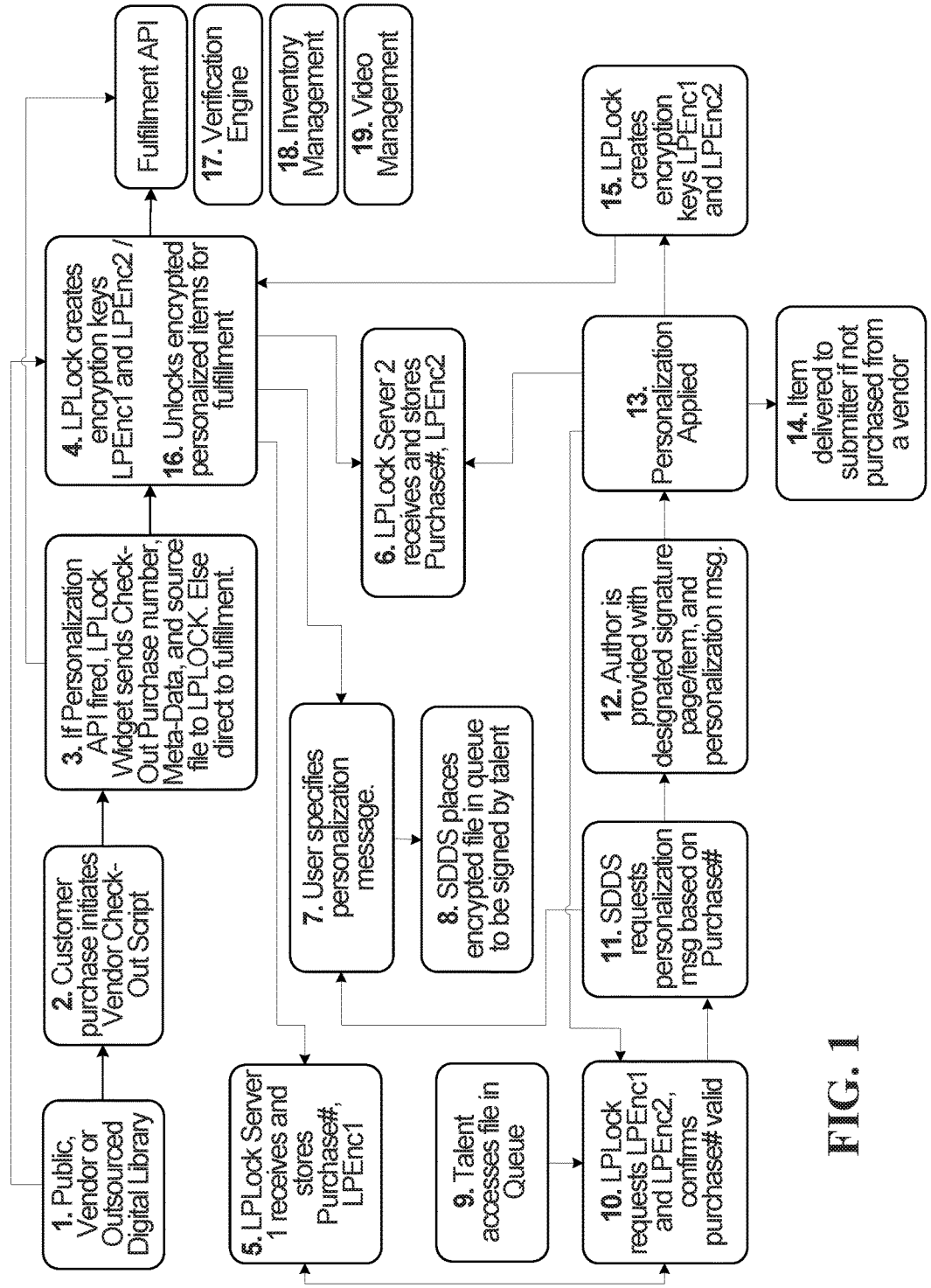
FIG. 1 is a workflow diagram illustrating the detailed workflow enabled by the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present invention provides a solution that enables the sale/distribution of information objects in a way that enables the creation of a human connection between two strangers, namely one or more fans (who may become a buyer/recipient of the information object) and one or more celebrities associated with the information object. The one or more celebrities may have created the information object, or been involved in its creation, or may have endorsed the information object, or product or service associated with the information object. The human connection is created by the server computer enabling virtual interactions between the one or more fans, on the one hand, and the one or more celebrities, on the other hand.

The server computer of the present invention provides a web platform for enabling said virtual interactions, which may include for example web based audio-video communication sessions, including for example web based audio-video group meetings. It should be understood that the present invention is not limited the use of any particular communication technology, medium, or protocol. Rather, the present invention contemplates the use of a variety of different communication technologies, media, or protocols, such as may enable now or in the future the fan-celebrity interactions contemplated by this disclosure.

In a particular aspect of the invention, the server computer is operable to compile profile data for each fan, and the server computer is further operable to access the profile data in order to personalize interactions between the one or more fans, and the one or more celebrities. This may include adjusting the communication interface and associated features presented by the server computer of the present invention based on the preferences of the particular fan.

The present invention creates a human connection by individualizing the information object, by enabling the celebrity to sign or dedicate the information object, and by providing the means to validate that it is the actual celebrity in an earlier instance who took the step to interact with the information object (whether the actual information object or unique information associated with the information object), for the one or more fans and thus in effect interacted with the one or more fans. For greater clarity, it should be understood that when this disclosure refers to the interaction between the celebrity and the information object, this interaction may be with the information object consisting of a unique digital product, such as a uniquely identified copy of an e-book, or unique computer instructions enabling a user to access a digital product that is made centrally available. The present invention enables the recording of an instance of signature/dedication by a celebrity, which is then associated with a particular information object, whether this is a particular copy of the information object or a profile of a buyer/recipient that enables the buyer/recipient to access the information object. Either way, the present invention makes the connection between the instance of signature/dedication and the buyer/recipient through the buyer's/recipient's right to obtain/access the information object.

The references to signature or dedication should be understood to relate to: (1) "two-dimensional" digital capture of writing in the sense of the result of a process that captures the appearance of the handwriting, and enables the duplication of this appearance into an information object; or (2) "three-dimensional" digital capture of writing, being a result of a process that captures not only the appearance of the handwriting but also one or more biometric parameters of handwriting that may be used to validate the identity of the writer. It should be understood, that in order to provide the validation of the information object, as described herein, it may be necessary to wrap around the signature/dedication of the information object a process that enables the verification that the celebrity signed/dedicated the particular information object. This can be achieved by way of example as illustrated below by constructing a master file that enables confirmation that the celebrity provided his/her unique sign in information when accessing the system, the celebrity interacted with the particular information object at a particular point in time, etc. While such a process can be used in connection with a three-dimensional signature or dedication, it should be understood that such a signature or dedication, provided for example using the SYNGRAFII e-signing technology disclosed in the patent application referred to below, enables the creation of a biometrically verifiable, forensically accurate electronic signatures that nonetheless is also unique, in which case such an e-signature is operable to enable the validation of the information object in and of itself.

The technology described enables the signing and/or dedication of any information object, but there are important advantages of the technology in promoting the sale/distribution of e-books, electronic music, digital art; sports memorabilia and movies especially. It is possible to attach a digital representation of a celebrity's signature or handwriting to a digital object associated with such entertainment content, such as a title page of an e-book, the electronic jacket of an electronic music album, the artwork associated with a movie download. However, every buyer/recipient knows that an ordinary digital representation of the celebrity's signature or handwriting may be digitally reproduced without effort, and without any interaction whatsoever between the celebrity and the actual copy of the information object purchased or received by the buyer/recipient. The opportunity, in other words, to create a human connection between the celebrity and the buyer/recipient or to associate the fondness of the buyer/recipient to celebrity with the purchase/receipt of the information object, in accordance with prior art technologies, is missed or diminished. This dehumanizes and substantially devalues the purchase or receipt of the content and acts as barrier to the adoption of electronic methods of distribution of entertainment content. The present invention solves this problem.

FIG. 1 illustrates the method of the invention, in its more detailed aspects. The method consists of: (A) the celebrity accessing a signature/dedication queue of information objects, (B) the celebrity, by operation of a signature/dedication utility associating a signature/dedication of the one or more information objects, and (C) distributing the information object(s) to the intended buyer/recipient such that the system is operable to validate that the celebrity signed/dedicated the information object(s) delivered to the buyer/recipient. The method of the invention, and FIG. 1 is explained in greater detail below.

Figure 2:
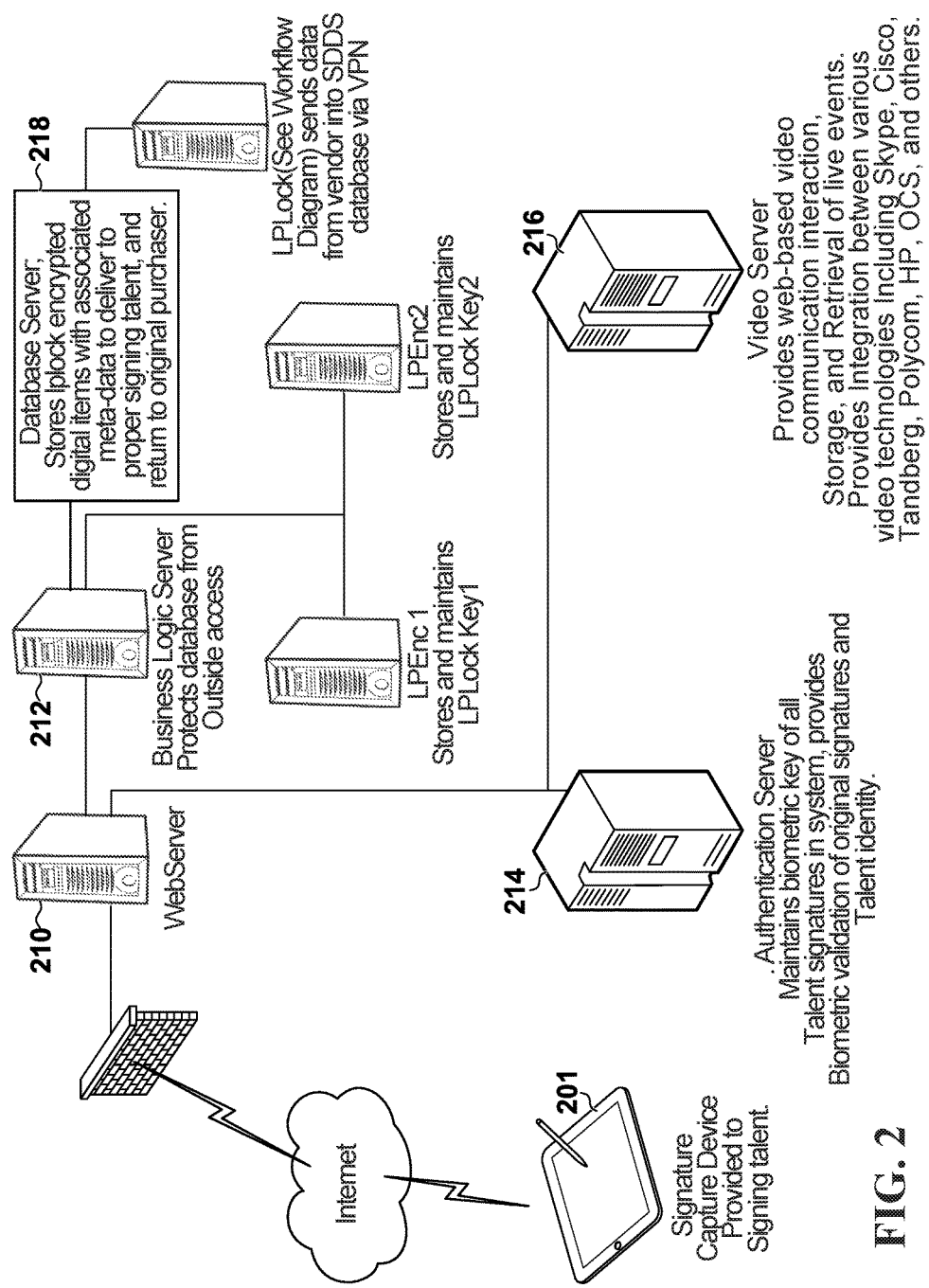
FIG. 2 is a system diagram illustrating a particular embodiment of the system of the present invention.

As shown in FIG. 2, the system of the present invention is best understood as consisting of at least a first or celebrity side system and a second or remote system connected to the celebrity side system, as illustrated in FIG. 2. The first system may include a tablet computer or other computer (such as for example a personal digital assistant, wireless handheld, smart phone or iPad™) that enables the celebrity to sign/dedicate one or more information objects for example using a digital pen. In other words, the celebrity is associated with a signature capture device 201 as shown in FIG. 2. The tablet computer is linked to a signature utility that is operable to associate a signature/dedication with one or more information objects such as a series of e-books, which signature dedication, as explained further below, the system of the present invention is able to validate as being original and unique to the particular information object in question.

It should be understood that the present invention contemplates various system implementations including distributed system architectures, social network distribution, cloud computing implementations, and deployment of the services described in accordance with a SaaS (Software as a Service) model.

As shown in FIG. 2, the signature utility may be provided by a signature capture device 201 associated with the celebrity, configured to interoperate with the authentication serve to enable the process described herein.

One aspect of the signature utility consists of a client application that may be loaded on the tablet computer. In one particular implementation of the present invention, the features described in this disclosure may be accessed using, on the client side, a web-based browser including standard plug ins such as for example MACROMEDIA FLASH™ or MS SilverLight™. In one aspect of the invention, the client application to may be configured to co-operate with a server application linked to a server computer server computer, and connected to the tablet computer via the Internet, as shown in FIG. 2. The server application includes other aspects of the signature utility of the present invention, as further explained below.

Also as shown in FIG. 2, the system of the present invention may be implemented using a web server 210. The web server 210 may be connected to a business logic server 212 which is operable to protect a database from outside access. The database may be implemented using a database server 218. The database server 218 may be operable to store encrypted information objects with associated meta data so as to enable the delivery to celebrity and then return of the information object for example to the purchaser in a signed/dedicated form. Authentication server 214 plays a role in validating that the celebrity produced the signature/dedication, as further explained below. The authentication server 214 may be operable to maintain biometric keys for signatures for all talent registered to the system of the present invention, and thereby enable biometric validation of signatures associated with information objects by operation of the system, and also to enable identification of talent. The implementation of the system of the present invention illustrated in FIG. 2, also includes a video server 216, which is operable to provide the web-based video interactions described in this disclosure (e.g. in relation to events enabled by the platform of the present invention). The video server 216 also enables storage and retrieval of live events for example using various known technologies such as SKYPE™, CISCO™ and so on.

The web server 210 may include or be linked to further functionality enabling the distribution of content (for example recordings of audio-video interactions involving signing/dedication of information objects as between one or more fans and one or more celebrities) to one or more content delivery platforms or websites, including for example dynamic distribution thereof based on content distribution partnerships between the operator of the web server and operators of third party web properties.

It should also be understood that web server 210 may include or be linked to one or more social media utilities that provide a social medial platform enabling one or more fans to connect with one another and/or interact with one another based on one or more social engagement processes. For example, the social media platform incorporated in the system of the present invention, or linking to the system of the present invention, may enable fans with similar interests to connect with one another. For example, the social media platform may be linked to an interface that in the context of one or more events described in this disclosure, enable a first fan to view information regarding a second fan, as authorized by the second fan, which then may enable the first fan and second fan to establish a social connection with one another, which they may then pursue outside of the event enabled by the present system. In other words, fans may meet electronically through virtual events initiated by the platform of the present invention, just as individuals often meet at real life events such as book signing, concerts and so on. One advantage of the interactions enabled by the present invention is that fans are presented with information, depending on the preferences of each other fan represented for example by a thumbnail including a photo which may be clicked to access further information, regarding potentially all of the participants in the event. The social media platform of the present invention also for larger events enables a first fan to display information regarding other participating fans based on one or more filtering criteria, such as age, sex, home town, aspects based on how the other fan relates to the celebrity (such as number of books of the author celebrity read by the other fan, favorite book by the author of the other fan and so on). It should be understood that all of this type of information may be stored to the database 218 so as to assemble profile data for the fan. Fans through their user setting may define what profile data is shared with whom, and under what condition.

The web platform of the present invention also enables the generation of two-dimensional digital products such as a digital signed image of the celebrity, and this content may be distributed to a large number of fans, for example as a "token" and for example to all fans participating in an event. Such tokens may be used as souvenirs, similar to the retention of concert tickets. The token may be placed on a fan's wall, either created within the web platform, or exported for example to a third party social media platform, such as for example the fan's Facebook™ wall. The token may be shared with friends using a wide variety of social media sharing operations.

It should be understood that the profile data referred to above may also be used by the platform of the present invention to support the interactions between one or more celebrity and one or more fans, for example in the context of an event enabled by the platform of the present invention. For example, a celebrity may access the celebrity area using a browser connecting to the web server 210 and thereby accessing one or more interfaces described below for enabling the interactions between the celebrity and fans in connection with the event. The celebrity area may be operable to display profile data relevant for the particular fan with whom the celebrity is interacting or about to interact, for example, the fan's interests, the fan's comments about why they respect the celebrity and so on. Access to such information act as an "ice breaker", facilitate smooth interactions, and assist in the celebrity and fan establishing relatively natural, positive connection. In other words, the web platform of the present invention enables automated and dynamic "prepping" of talent in connection with interactions with fans, and also coaching. For example, by displaying profile data, the celebrity may be reminded that s/he has interacted with the fan before, and therefore greet them by saying "Nice, seeing you again, Bob." The celebrity may also be informed that a particular fan has collected signatures from a number of other authors, including for example authors that the participating authors knows, which again creates the basis for discussion and connection between the fan and the celebrity.

It should also be noted that the web server 210 may include or be linked to a known logging utility for logging various interactions and activities of fans and/or celebrities. Information regarding fans may also be pulled from third party sources such as social networking websites. This information may be used to update or extend the applicable profiles in the database 218. The web server 210 may also link to or incorporate a known analytics engine which may be operable to analyze profile so as to generate analysis data pertaining to a particular fan, or groups of fans so as to enable the collection of trend data, including as it relates to interest in or consumption of content, or interest in particular fans. The profile data of course may include demographic data and location data. The profile data, state of the art analytics, in connection with the fan/celebrity interactions enabled by the present invention, enables the generation of valuable analytics of interest to content publishers for example but also political campaign managers and the like.

Figure 3:
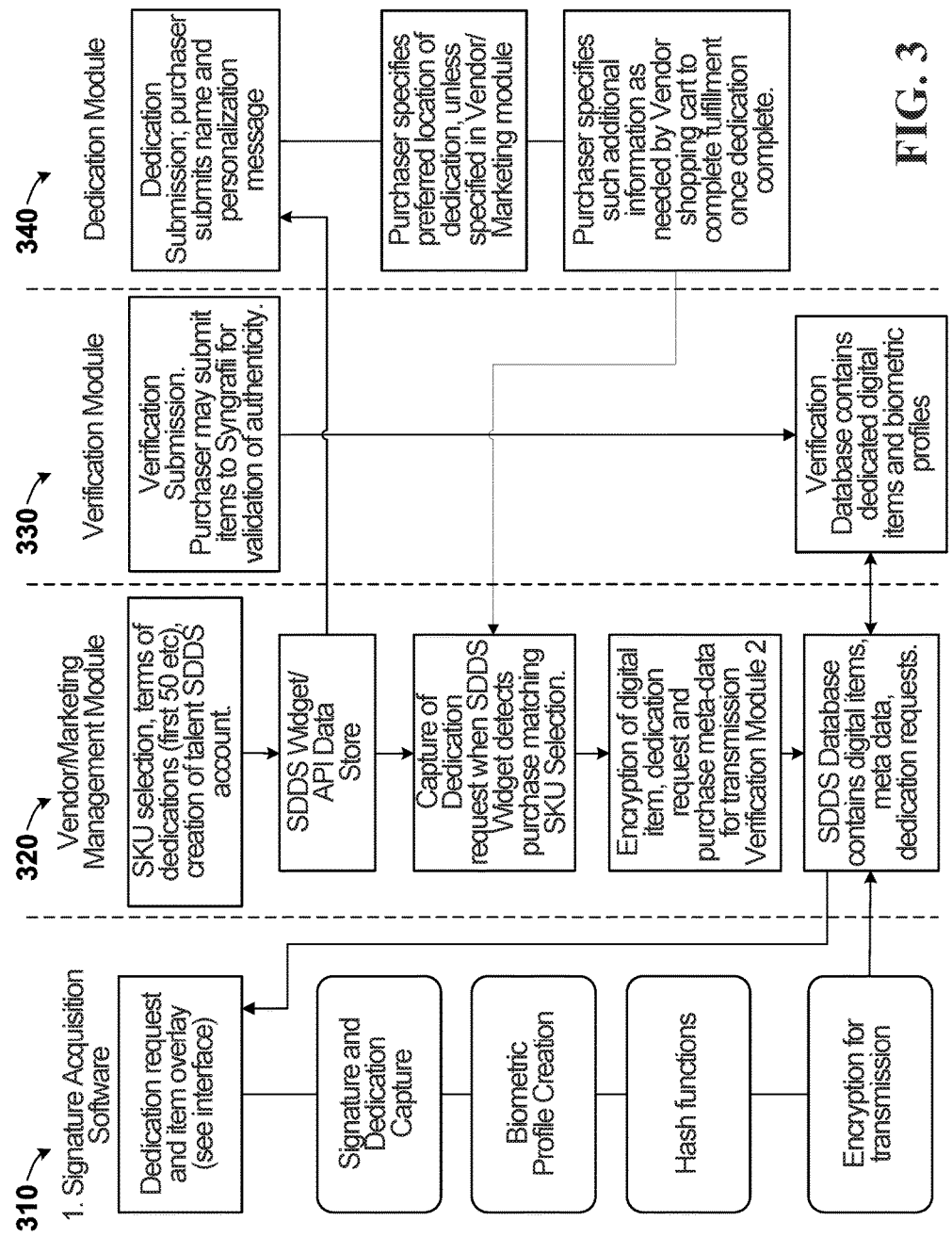
FIG. 3 is a program resource diagram that illustrates the resources of the computer program of the present invention.

The computer program of the present invention, in one implementation of the present invention, is best understood as a distributed program architecture including one or more software components resident on the tablet computer or a handheld device, and one or more associated software components part of the server application. The functions of the computer program, in one aspect thereof, are illustrated in FIG. 3. The signature acquisition software 310 or signature utility resident on the device associated with the celebrity, supports the operations shown in FIG. 3. The vendor/marketing management module 320 shown in FIG. 3 co-operates with the signature acquisition software 310 to obtain the data items required to provide the signature/dedication, linked to the celebrity, as described herein. The dedication module 340 shown in FIG. 3 is operable, among other things, to obtain the information regarding the one or more fans that is required to provide the desired signature/dedication, including for example the name and dedication text for the signature/dedication as well as information required to associate the particular information object with the particular fan. The system described integrates with the various systems used by the vendors/marketers of information objects that provide among other things digital rights management functionality including copy, access, and distribution restrictions application to the information object.

Figure 4:
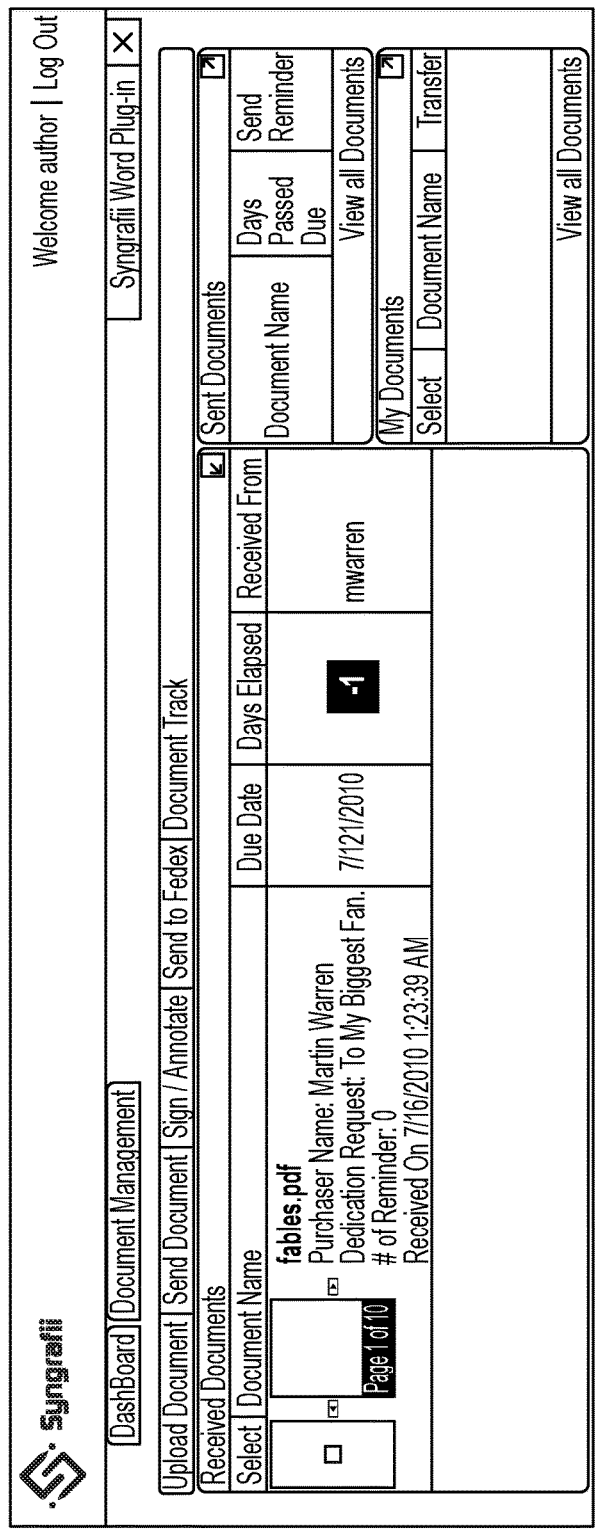
FIG. 4 is a diagram illustrating a representative illustration of a management interface presented by the signature utility of the present invention for managing the signature/dedication of information objects.

FIG. 4 illustrates a representative interface presented to the celebrity, as part of the functionality of the vendor/marketing management module 320 to guide the celebrity through the process associated with signing/dedication in accordance with the present invention.

Figure 5:
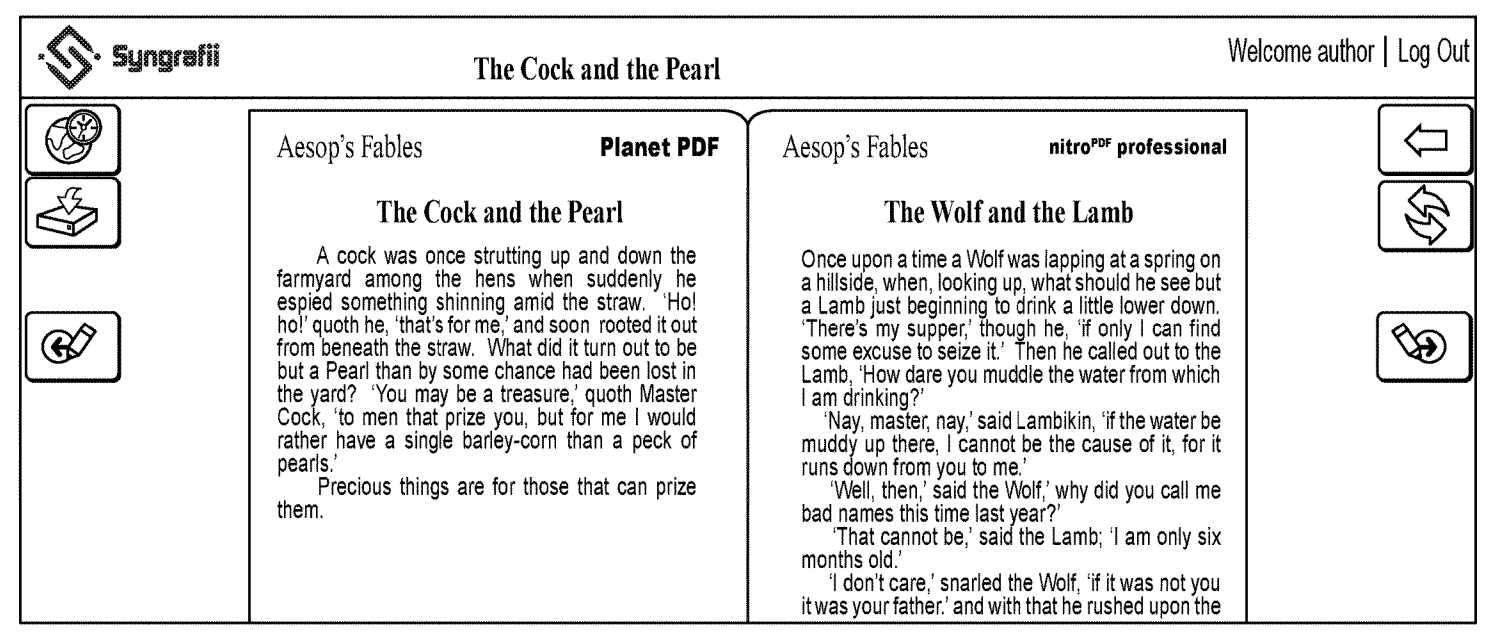
Figure 6:
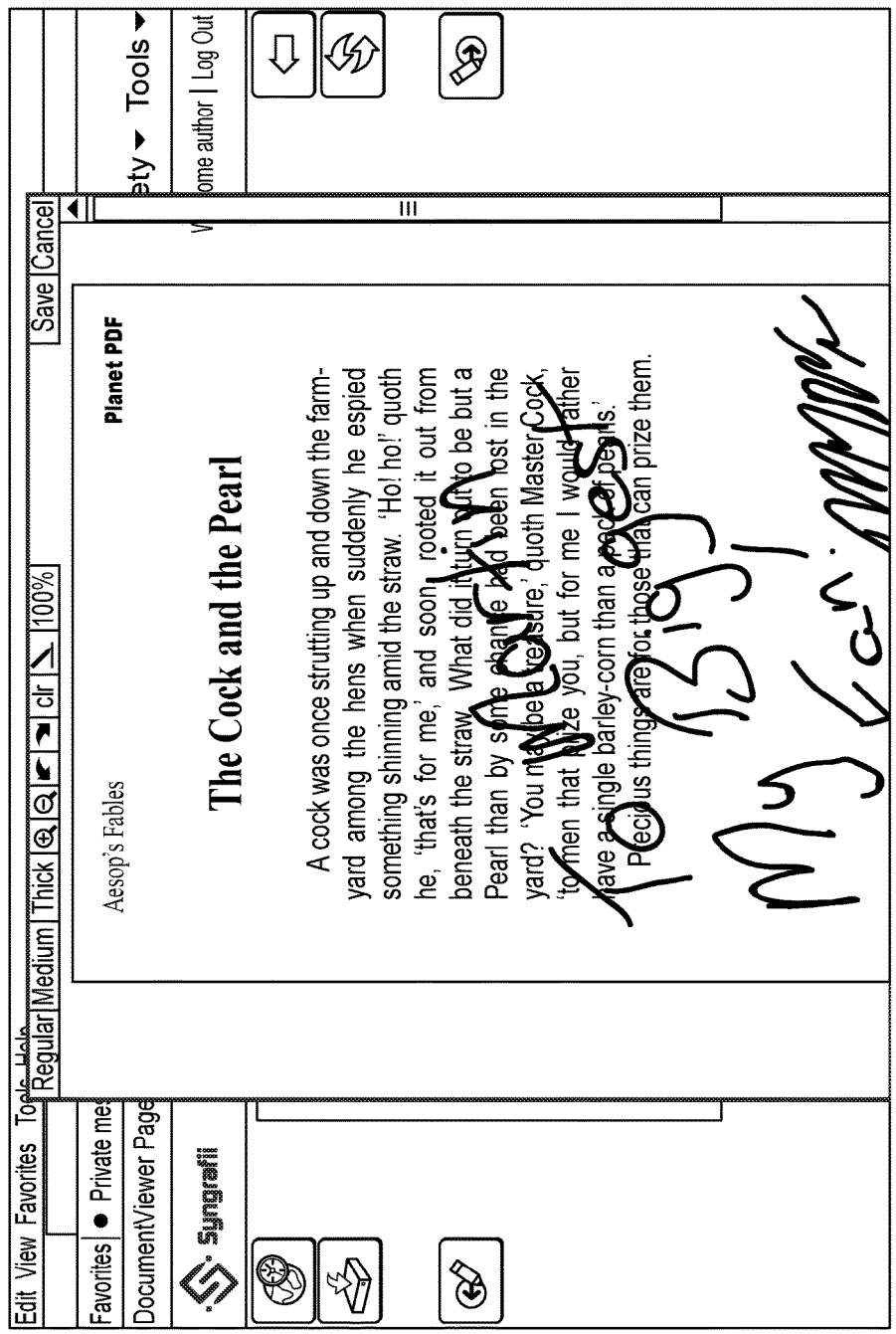

In one aspect of the invention, the signature utility is operable to create one or more distinct areas that are dedicated to one user only (for example a celebrity), authorized to sign and/or dedicate information objects by operation of the signature utility, for example as illustrated in FIGS. 5 and 6. The signature utility includes or is linked to an authentication utility that is operable to obtain authentication information from a registered celebrity, such as a username and password that is provided at the tablet computer through a web interface, thus enabling the celebrity to sign into their dedicated area. In one aspect thereof, the signature utility integrates with or includes functionality similar to a document management system. It enables the management by the celebrity, or an entity with whom the celebrity is working such as a publisher or distributor of the information objects, of the information objects that require signature/dedication by the celebrity as illustrated in FIG. 2. These information objects may be arranged for example into a queue showing the specific information objects requiring signature and/or dedication by the celebrity.

It should be understood that the signature utility may include or be linked to a variety of other utilities directed to the management of the signature/dedication process. These may include notifications or reminders to the celebrity regarding new or unfulfilled requirements for signing/dedication.

Also, the web server may be linked to other systems (for example an API) that enable for example the on demand creation and distribution of physical products based on the information objects or related to the information projects. An example of such a system is an on demand printing service that enables the printing of a physical version of a book, including a signing/dedication created by operation of the present invention. One aspect of the invention therefore is the integration or linking to a service that enables the signing of physical objects (e.g. paper books, hockey sticks, jerseys and so on) as well as digital products via an integrated process and platform.

In a particular aspect of the present invention, information is obtained for one or more intended recipients for the information objects. For example, a seller of a-books may provide information regarding the name of an intended recipient and possibly the particulars of a requested dedication, to be written in the celebrity's writing, and validated as emanating from the celebrity by the system of the present invention. The server of the present invention may be linked with a database, and this database may be linked to a database associated with a seller of information objects, so as to present to the system of the present invention data that may be required for the celebrity to provide the dedication of the information object requested.

The system is configured to protect personal information of buyers or recipients while providing access to the data for enabling signature/dedication of information objects by operation of the present invention.

In one aspect of the present invention, a celebrity may access his/her web area linked to the server, via a tablet computer or other suitable computer device. The celebrity may select one information object at a time for signing/dedication. The server application is operable to present relevant instructions or information to the celebrity—such as "DEDICATE E-BOOK: "TO GARY ON YOUR BIRTHDAY, AUTHOR SIGNATURE". The celebrity may then be presented with a button which when initiated presents for example on a tablet computer a screen showing the specific part of the information object where the signature and/or dedication will be applied such as an image of a title page for the e-book, over which the system of the present invention is operable to place an overlay for receiving a digital representation of the celebrity's signature and/or dedication in their handwriting. The signature/dedication is associated with the particular information object only. The signature utility may include or be linked to an authentication utility, that is operable to authenticate that (A) the signature and/or dedication is that of a particular celebrity, and further (B) that the instance of the celebrity's signature and/or dedication, is unique to the particular information object.

Regarding (A), in one implementation of the present invention, the authentication utility may incorporate the functionality of the "authentication utility" disclosed in PCT/CA2007/000809, for a "System, Method And Computer Program, For Enabling Entry Into Transactions On A Remote Basis". Specifically, the authentication utility of the present invention is able to validate that the signature and/or dedication of the celebrity is biometrically accurate, and therefore emanates from the celebrity. This may be done using Applicant's proprietary method of analyzing the handwriting data of the celebrity, captured in accordance with the present invention, using various means know to those skilled in the art of digital analysis of handwriting. In one particular embodiment of the present invention, the authentication utility incorporates one or more handwriting analysis routines for analyzing the digital pen path recorded for a particular instance of handwriting associated with the handwriting or signature captured in accordance with the invention, and this digital pen path is compared against previous digital pen paths for other instances of handwriting or signature stored to a memory associated with a central authentication server (part of the server computer or linked thereto), and made accessible to the authentication utility for authentication purposes.

In one particular implementation of the present invention, upon confirmation of the identity of the celebrity or celebrities associate with the information object, the authentication utility is operable to issue a certificate that confirms the identity of the celebrity or celebrities, and this certificate is linked to the information object for example, by affixing a digital seal to the information object that confirms authentication.

In another aspect of the authentication functionality of the present invention, the present invention may rely on Applicant's generation of an "authentication file", also referred to as an audit file or master file, associated with the signature and/or dedication of the particular information object. The purpose of the authentication file is to authenticate and provide audit capabilities to all parties. In one particular embodiment of the present invention, the master file is a set of linkages to other files which provides authenticity of the component files referenced by the master file. These references are maintained by "hash" codes and encryption. The master file references any number of audit files that may include (1) a unique identifier for the particular information object, such as a unique tag created by the seller or distributor of the information object, which may be used in part for digital rights management; (2) an audio/visual transaction record (in the event that the signature/dedication of the information object is associated with a personal interaction between the celebrity and the buyer/recipient, that is captured electronically, and may be part of a signature/dedication event described above; (3) biometric confirmation for authentic identification of participant(s); (4) date and time stamps; and/or (5) serial #s and/or IP addresses of the hardware used for the purpose of the signing/dedication (e.g. IP address for the computer, associated with the celebrity, that was used for the signing/dedication, and optionally the central authentication server).

The authentication file may also include: (A) identification data for the celebrity such as their username/password data, or the fact that a successful login using this data was processed; (B) one or more audio or video images related to the transaction for authentication purposes (video images of the celebrity, for example, could be compared to images on file to establish identity); or (C) be linked to a digital signature verification system to which the celebrity has been registered. In one particular implementation of the present invention, the authentication file may be a coded file that when opened will retrieve files associated with the authentication file and optionally will execute a program to extract the information that serves to authenticate the transaction. In one particular aspect of the present invention, the master file authenticating the signed/dedicated information object, or more precisely authenticating that the celebrity signed/dedicated the information object in a particular instance of interaction by the celebrity with the particular information object (or its identifier) earmarked for the buyer/recipient, some personal identifier of the buyer/recipient, or a capture interaction between the celebrity and the buyer/recipient (for example in conjunction with a signing/dedication online event described below). The master file may be stored and used to validate the signed/dedicated information object when for example there is a request for validation.

It should be understood that similar resources or techniques can be used to personalize the artwork associated with an electronic musical file, or a movie, or digital objects associated with a video game or social networking virtual world, by means of signature and/or dedication as described.

The authentication of the information object, based on the technology, can be reflected in any manner of symbol or other messaging associated with the information object, such as for example a "VERIFIED BY SYNGRAFII" message or application of logo to the information object on receipt thereof.

It should be understood that the information object may also consist of an electronic file that is associated with a particular product or service, for example, by bearing a unique code or token associated with the product or service, which is the signed/dedicated electronically in accordance with the present invention, thus enabling authenticated electronic signing/dedication of products associated with said electronic file. The master file could be used to authenticate for example that an electronic signature of a celebrity, captured to generate memorabilia, for sale for example at a charity auction, was actually signed by the celebrity in question. The present invention enables the digitization of this business, and furthermore enables greater assurance to be provided that a signature is authentic and unique to the product in question.

Audit Utility

Another aspect of the present invention may include an audit application, as described in previous patent applications of the Applicant, which may log each instance of application of a dedication/signature to ensure that information captured by the present invention is not applied to an unauthorized use such as attempted signing forging of a signature of a cheque. One aspect thereof may consist of the verification module 330 illustrated in FIG. 3 that enables verification, if required, that the information object, presented as being signed/dedicated by the celebrity was in fact signed/dedicated by the celebrity, as a unique instance of signing/dedication.

Information Object Download/Digital Rights Management

It should be understood that in most instances the buyer/recipient may want to receive the information object immediately, even though the buyer/recipient wants to received the originally (digitally) signed version which may take some time to prepare, because the celebrity has to reach the particular information object in his/her queue. For various types of digital entertainment content, however, there are copy restrictions that apply to digital content, in part because of digital rights management. In one aspect of the invention, an e-book is bought by a buyer or bought for a recipient by another buyer. The buyer/recipient will typically receive an email notification of the purchase, which contains data required to enable the buyer/recipient to download the e-book to their iPad™ for example. The buyer may have elected to pay an extra fee to receive one of a limited number of e-books that will be signed/dedicated by a celebrity (thus providing the publisher the ability to release "FIRST RUN" limited editions which may not be possible with prior art solutions), or possibly in conjunction with the release of a new e-book there is a promotion whereby the first X number of purchasers of the e-book will be entitled to a signed/dedicated version. It is conceivable that a signed and dedicated version may cost more than a copy that is signed only.

The buyer/recipient may receive an initial copy of the e-book that is not signed, once the signed version becomes available, the system may be operable, upon clicking on a link for example, to initiate the deletion of the unsigned, undedicated version of the e-book and its replacement with the celebrity signed-dedicated version.

The present invention contemplates integration of the system with the electronic distribution systems of the sellers or distributors of information objects, in part to enable compliance with digital rights management associated requirements. In relation to e-books for example the present invention may be integrated with the various reader platforms that are currently available or that may be available in the future. For example, the present invention may be integrated into the checkout process involved in a buyer/recipient obtaining his/her e-book. An API associated with the e-book distribution platform may verify if the purchase has meet the various associated conditions for the purchase, including optionally the personalization of the e-book by means of signing/dedication by operation of this invention, which has been required by the buyer, or the buyer for the recipient. If a signing/dedication of the e-book has been specified, then the API is operable to enable the system of the present invention to access the information object or otherwise to present the information project for signature/dedication in accordance with the process described herein. The celebrity, in this particular case an author, will then access the signature utility as described to complete the signing/dedication as requested. This signing/dedication is completed and recorded, and a message to this effect is presented to the e-book distribution platform along with data elements required by the operator of the e-book distribution platform in order to present the signing/dedication to the buyer/recipient. In some cases, this may consist of a signed/dedicated title page, or other page, being stored by the e-distribution platform and made accessible to the associated buyer/recipient. If the e-distribution platform involves providing a resident copy of the e-book to the buyer/recipient it is possible that a copy (not signed or dedicated) may have previously been provided to the buyer/recipient (while the signed/dedicated version is being created), in which case the e-distribution platform may be operable to initiate the deletion of the unsigned/dedicated copy prior to providing the signed/dedicated copy once it is ready.

Online Signing/Dedication Events

It should be understood that the present invention contemplates including or linking with over the web audio/video capability. This enables online signing/dedication events to be scheduled; particular users to be selected an invited to participate at a given time; signing in using a username password that was given previously; accessing one to many communications with the celebrity; and optionally also waiting in queue for a one on one interaction with the celebrity. The celebrity's tablet computer can be provided (or includes) with a web camera that permits these interactions, as well as the buyer/recipient's computer may include a web camera as well, and video meeting functionality associated with the server computer may provide can manage the one to many and one on one interactions described.

Such events could occur in conjunction with a sale or after the sale of the information object.

Likely in connection with the one to one interactions between the celebrity and the buyer/recipient, the document management described brings up the appropriate information object, which is signed and/or dedicated, and then authenticated by operation of the present invention. Alternatively, more advanced video technology may be linked to the server computer in order to enable higher quality interactions between the celebrity such as for example a video transceiver box from POLYCOM™ or CISCO™.

A monitor is preferably linked to the camera such that the celebrity can view the image of himself/herself and of her surroundings that will be made available or is being made available to others participating in the particular session.

The method of the present invention comprises the steps of (or a sub-set thereof): 1. a request being made to deliver an information object to a buyer/recipient that is signed and/or dedicated; 2. the information object or data elements identifying the information object being delivered to a signature utility that defines a signature/dedication area associated with a celebrity; 3. notifying the celebrity of a requirement to sign/dedicate the information object; 4. the celebrity logging in to his/her signature/dedication area and signing and/or dedicating the information object based on one or more instructions associated with the information object; 5. the signature utility capturing one or more data elements associated with the signature and/or dedication of the information object by the celebrity for authentication purposes; 6. initiating the delivery of a notification to the buyer/recipient that their information object is ready for provisioning to one or more devices associated with the buyer/recipient; 7 providing the signed and/or dedicated information object to the buyer/recipient, or if the buyer/recipient has already been provided the information object in an unsigned/undedicated version, then replacing the unsigned/undedicated version with a signed and/or dedication version of the information object.

The method may also include the additional step of initiating an online audio-visual communication session between the celebrity and one or more buyers/recipients.

It should be understood that along with the delivery of the information object in question, additional computer files may be delivered such as a video message from the celebrity or digital files representing an audio-video interaction between the parties, for example, in connection with a live event as described herein or other promotional files such as single music tracks, photographs, coupons, or special offers.

It should be understood that the present invention may be used by a number of different users including:

a) A promoter—this refers to the individual, company, or group that wishes to promote either themselves or another individual by having that individual personalize digital media for their fans. This may include publishers, music labels, agents, promoters, sponsors, media companies, and more.

b) Talent or celebrity—this refers to the individual, band, group, team, etc that will complete the personalization of the information object.

c) Vendor—this refers to the company, group, etc that provides a service by which members of the public are able to purchase information objects from. This includes, but is not limited to, AMAZON™, APPLE™, Kobo™, Barnes and Noble™, Borders, Netflix™ and more.

d) Fan or buyer/recipient—this refers to any member of the general public that wishes to have a information object that they have purchased from the vendor personalized by the talent.

For clarification, "SDDS" in this disclosure refers to the Syngrafii Digital Document System, which is a web application created by Syngrafii for managing the application of Syngrafii signatures/dedications to an information object such as in the case of this disclosure, an information object.

It is useful to explain the types of interactions that may be possible between the fan and talent.

Additionally, it is important to understand that there are at minimum two types of events which may occur that utilize signing/dedication in accordance with the present invention, namely scheduled events and live events. In one aspect of the present invention, the server application of the present invention includes or is linked to one or more utilities operable to enable web events.

Scheduled events are pre-planned events which do not involve direct interaction between the talent and fans, but instead result in the fan receiving a personalized information object as part of a purchase transaction from a vendor. Live events include direct one-to-one or one-to-many interactions between the talent and the fan(s) and may also result from a purchase transaction from a vendor or, may be accessed through a special VIP purchase of a pass or ticket, or, may be used as part of a fund-raising event; and may also consist of online auctions. These interactions may also be associated with promotional products such as providing access to particular information objects for free promotional purposes, or based on sponsorship by a company in connection with a marketing campaign.

In order to initiate the process, in certain aspects thereof, a promoter may identify the digital media that can be signed by the talent—or the talent may choose to create a one of a kind digital product during the signing session, or, may load images they wish to work with and distribute of their choosing. Each promoter who wishes to utilize the present invention may be provided with their own user account. Any person may apply for a promoter account through an online portal linked to the system of the present invention. The approval of the promoter account will be provided by the Server Administrator. Once this account has been created, the promoter may be required to request approval from the vendor to conduct an event. This is used in order to prevent users without proper access from creating events for talent or vendors that they have no right to access. Additionally, it ensures that communication between the promoter and the vendor has occurred in advance of the event in order to ensure that such publicity and agreements are in place to support the signing event.

The present invention also contemplates the use of or incorporation of signature recognition technology or processes to enable further verification of the authenticity of the signature applied by the author. This feature may be integrated into the platform of the present invention to further ensure that digital products dedicated/signed by operation of the present invention were not created for example by a designate of a celebrity, or a person impersonating the celebrity.

In order to request approval to host the event, the promoter may select the vendor that they are working with, the title that they wish to have personalized (ISBN, SKU#, etc), the conditions for the dedication (for example, first 100 purchasers, additional $2.00 per copy, etc), as well as an indication of whether the event is a scheduled event, recorded event, or live event Once the event details have been completed, the application may be submitted to the vendor for approval. If approved, the promoter may be notified, and supplied with a user account and password to be provided to the talent which they will use to dedicate the materials. Additionally, the promoter may be provided with an interface displaying the information object which they have selected to be personalized. Again, this may be an e-book, cover art, etc. The promoter may use this interface to select what page (if applicable) is to be signed by the talent. This may be the cover, title page, etc. This process will not happen if there is only a single page which may be signed.

The promoter may be provided, by operation of the system of the present invention, with a special VIP console. This will allow the promoter to create access accounts for VIP level fans to take part in an event without completing a purchase from the vendor. This may only be applicable to live events, and may include members of the media, marketing company, record label, publisher, etc. The promoter portal may also provide the promoter with reporting capabilities in order to track the success of the event including number of sign-ups, value generated, rate of sales, and other such data as available.

Scheduled Event

Once an event has been approved, the talent shall be granted access to the portal by the promoter. The talent portal will be a streamlined interface allowing for quick and simple dedication of information objects for the fan (as explained above). Before the event is initiated, and during the signing process, the talent will be provided with a summary of the event including a preview of the item that they will be signing, as well as the event details including anticipated start time/date, and the conditions of the event (number of items to sign, etc). Once an event has been initiated (conditions for dedication have been met and items are waiting to be signed), the dedication requests may begin to queue into the "Awaiting Actions" or equivalent as described. This will allow the talent to preview the requests that have been made, including the text of the dedication request as well as the name of the fan that has requested the dedication. Basic search functions will also be provided which will allow the talent, if they wish, to select specific dedication requests for VIP items. Once VIP items have been completed, if appropriate, then the talent may begin to clear the queue of dedication requests. This will display the page selected by the promoter for dedication, as well as the name of the fan and the details of the dedication request. The talent will be able to complete the dedication, and then hit "next". This will save the dedication, and then display the next dedication request to the talent. This will allow the talent to work their way through the queue quickly and efficiently. They may choose to stop processing through the queue at any time, and return to it at a time and date of their convenience. Once all conditions for the event have been met, the talent's username and password may expire. Each event, even for the same talent, may be created with a separate username and password as part of the vendor approval process. This will ensure that there is no confusion by talent users which may have several events happening at the same time as to which event they are participating in at any given time.

Recorded Event

For a recorded event, the same process as above will occur, however on each dedication page, the system may display beside the dedication page a window showing a preview from a webcam attached to their computer. Once the talent has completed a dedication, a record, stop, complete, and retry button will become active above the preview window. Pressing "record" will allow the talent to record an audio/video greeting to the fan. Once the talent is satisfied with the recording, pressing complete and confirming acceptance will upload the audio/video recording to YouTube™ for example, and email the link to the video to the fan, by operation of the system of the present invention.

Additionally, prior to the event, once a talent has a "recorded event" approved for them, and their portal is created, they will be given a "practice room". This will include a replica of the actual event interfaces with fake dedications and the recording function. This will allow the talent to practice with the recording feature, and pressing complete will email the video dedication to themselves, thereby allowing them to experience and become comfortable with, the recording experience as well as an opportunity to view the results.

Live Event

When a promoter specifies a Live Event, once it is approved by the vendor, then the same process may occur for account creation for the talent as in the other events. However when they log into their system, they may see a queue of items waiting to be signed, as well as a large mainly blank window which will display the time and date information of the live event. For example one hour before the start time for the live event, this window will automatically display the Syngrafii Live Event Portal, which will initially display a large window showing the talent image supplied by a webcam, this time can be used for staging, getting comfortable etc. 15 minutes before the event starts, the system will allow those fans who have been selected for example because they have purchased items and have been invited to the event, to begin accessing the system. The talent will begin to see small webcam windows of the attendees appearing on the screen. Basic controls will also appear, allowing the talent or an event manager to block, mute, or kick/ban any attendees. The fans will not see the talent until they press the "Ready to Begin" button. Pressing the "Ready to Begin" button places the event into "Presentation" mode. This will allow the talent to welcome the attendees to the event. If they wish, the talent or the event manager, can select one of the attendees cameras to enlarge them and allow them to interact with the talent during "Presentation" mode. This is particularly useful for interviewers, facilitators, etc. In "Presentation" mode, the fans will see a full-screen video feed of the talent, and that full-screen will break into smaller screens as decided by the talent or event manager as they bring in an interviewer, etc. At the end of the "Presentation" (interview, other appropriate event", the talent may select one of the information objects that is waiting for them to sign. The system will prompt the talent if they wish to leave "Presentation" mode, and if confirmed, will automatically enlarge the webcam feed of the person who purchased the information object and allow them to interact with the talent. Once the personalization has been completed, the talent will select the next item to be personalized, which will minimize the previous fan, and maximize the newly selected fan, allowing their interaction. This will continue until all attendees have had their information object personalized. The talent, or the event manager, may choose at any time to return to "presentation" mode for any reason they choose.

During the celebrity event, the entire interaction may be web streamed or distributed using some other content distribution technology or method to one or more social websites linked to the system or the operator of the system, or the social website or the websites of a participating partner for passive viewing by audience members not participating directly.

At the close of the event, a recording of the full event will be uploaded automatically to iDoLVine social site and at some point to YouTube™ or other social networking property and each user will also be provided with a separate recording of their personal interaction with the talent.

It should be understood that the interactions enabled by the present invention enable the creation, at a relatively low cost, of highly interactive content, which may be of interest to large numbers of people. The demand for interactive content is known, and the interest in celebrity is also known. The present invention leverages the ability to validate the participation of the actual celebrity to create a web environment that is imbued with a real and meaningful connection with the celebrity, expressed in real time. For users with a particular interest in a celebrity or group of celebrities, the content created by operation of the present invention is of a high degree of interest, enabling very significant user engagement and interest, which in turn is of interest to content publishers, advertisers, and so on.

Vendor Experience

The vendor may be responsible for managing and approving the promoters that are able to create and access events. The reason for this is that in one particular implementation of the invention all signing events is triggered by a purchase, and the system may be configured to not allow for fans to submit previously purchased materials for dedication. As a result of this, the fan experience will begin after completing a purchase from the vendor, and as a result, the vendor may be linked to the event. It is important that the transition between the vendor purchase process and the fan experience be as smooth as possible.

The vendor may be provided, by operation of the web platform of the present invention, with controls which will display the list of Event Requests that have been submitted, and allow for the vendor to approve or deny the events as required. These event requests may include the information submitted by the Promoter as part of the event application process. The Vendor portal may also display reporting info on events and allow for basic data manipulation to span reports across timelines, events, promoters, etc.

Fan Experience (i) Scheduled Event.

Once a fan has completed a purchase of an information object, or there is some other trigger for the system, such as for example receipt of information concerning a promotion, VIP purchase, first in line promotion (e.g. wristband policy), or any other method that may be used for example to promote music, books, concerts, special events, and so on, then the fan may be notified that they are eligible to have an information objection personalized by the talent. The fan may be provided with the event details, and be asked to provide the name of the person that they would like the dedication made out to (themselves or another), as well as the details of the dedication. The fan may receive an immediate copy of their non-personalized purchase. Once the talent has completed personalizing the fans purchase, the information object may be delivered to the fan, replacing the non-personalized item, and the fan may be notified via e-mail that the personalization has been complete.

All dedications will include a unique "Verified by Syngrafii" number or equivalent or digital watermark. This number may be included in the notification email, along with instructions to verify the signature. By accessing the SDDS system, they may be able to provide their unique Personalization Number into the site SODS may return all of the audit information for the personalization including the time/date of the signature, the name of the purchaser, the details of the personalization request, an image of the personalized item, and other such information. It is expected that the level of this information will increase over time (ii) Recorded Event For recorded events, much the same process may occur, however the notification email may also include a link to the uploaded video dedication hosted on iDoLVine (we want to drive membership) and ultimately YouTube™. The fan may then access the link to view or download the video from the YouTube™ Site.

(iii) Live Event

If a fan purchases an information object which is indicated as belonging to a Live Event, then once they complete the dedication request information above, they may I receive an email invitation to the Live Event system. Until 15 minutes before the event starts, clicking on this link may bring the fan to an information window which will state that the event has not started yet, and will begin at specified time/date. Once the 15 minute window is open, clicking on this link will prompt the fan to enter their attendee ID, which will be included in the email that they are provided, or simply embedded into their link, bypassing this process. This will then bring them into the event site. They may see a full-screen window of the talent, which may potentially be split-screened with an interviewer or facilitator, as well as small preview windows displaying the webcams of other people in attendance. Those users who do not have a webcam may appear as a black window—or may have their iDoLVine membership profile picture statically displayed along with other profile data they may wish to share. Once the talent has finished addressing the fans either through a reading, performance, etc, they may move to personalizing the purchases of one or more fans. As a fan, once the talent selects your information object, your webcam may split screen with the talent, and your microphone may be enabled. If the fan does not have a webcam, then the interaction may be audio only. The fan may be given an opportunity to converse with the talent while they are personalizing the purchase. Once the interaction is complete, your webcam window will minimize again and the talent will move on to the next fan. You may choose to remain and view the remaining signing sessions, or leave as you prefer. Your personalized information object will be delivered promptly following the completion of the personalization. As with a recorded event, you may receive a link to a YouTube™ site or other vide content delivery site, which will include both the recording of the full live event, as well as a separate recording of your interaction with the fan.

In one example of the implementation of the present invention, FIG. 1 illustrates a representative system workflow:

1. Public, Vendor or Outsourced Digital Library: This is the repository of source files of electronic items to be signed. This can be electronic source files of any type including but not limited to music, images, video, e-book, pdf, doc, etc. These files are generally stored in an unencrypted/DRM free state, however may not always be the case. If the item to be signed is sent from a member of the public, it is sent directly to LPLock for encryption and protection.

2. Customer Initiates Vendor checkout Script: If the item to be signed is purchased from an electronic vendor, the vendor checkout script will process the purchase as part of their standard process, and a purchase number is created.

3. If the purchase is not indicated as an item to be signed, the LongPen Widget does not fire, and the file is passed through to the vendor fulfillment engine for delivery to the customer for example pursuant to a standard process. If the item is to be signed, then LongPen Widget may initiate and the document may be routed to LPLock for encryption and protection.

4. LPLock1 executes proprietary algorithm LPLock1 (LPEn) and LPLock2 (LPEnc2), file is then encrypted sequentially with both locks, and a HASH value is generated.

5. LPLock Server1 receives and stores LPEn and purchase number.

6. LPLock Server 2 receives and stores LPEnc2 and purchase number.

7. Purchaser is provided with an interface in order to specify the personalization message that they wish to apply to the item. This is stored along with purchase number.

8. SDDS reviews file meta-data and determines which talent is to sign the specific item. Creates a queue of items for that talent to sign and personalize through the standard SDDS interface.

9. Talent (celebrity) accesses queue through SDDS portal.

10. LPLock requests encryption keys from LPLock1 and LPLock2 as separate service requests. If item has a purchase number, confirms with vendor shopping cart that purchase number is still valid and has not been cancelled by vendor due to myriad reasons including chargeback, etc.

11. SODS requests personalization message from personalization script, entered by client in step 7.

12. SODS renders file along with personalization message and provides interface for talent to digitally apply personalization message to file.

13. Personalization is applied to file, in a method conforming to the file type of the source file. Will utilize an XML Parsing engine to determine best method based on format. May either embed directly onto file/image, or may be included as meta-data, xml tag, html tag, or other insertion method as appropriate.

14. If item was submitted by a member of the public and no vendor purchase# exists, the file is returned to the purchaser either through email, SDDS, or another appropriate method.

15. LPLock2 re-encrypts the file using LPEn and LPEnc2. Encrypted file is passed back to LPLock1 for decryption within the vendor system.

16. Once the dedication process has been completed, the dedicated item is passed back to the vendor through a fulfillment API. This process is normally, though not absolutely, a process by which an XML purchase order is passed to the vendor which includes an embed URL which will allow the vendor to respond with an XML request to download the dedicated item.

17. As it is contemplated that a resale market is emerging for signed digital items, the SDDS process will enable users to track and transfer ownership of signed digital memorabilia obtained through the system. Each digital dedication generates a HASH value, generated in Process 4. A member of the public is able to upload a digitally dedicated item to our website, app, or other interface. This file will then be parsed via LPLock1 and a HASH value of the uploaded file will be generated. The system will then determine if there is a missing HASH value in the archive of dedicated items, and if a match is found, will display the owner of the dedication and the macro details surrounding it. Should the person wish to transfer ownership of the digitally dedicated item, then this can be done here. The original owner information will still be retained, but a transfer of ownership will be logged, and the dedicated item will then flow to the Fulfillment API which will DRM and deliver the transferred item to the new owner.

18. It is contemplated that due to the volume of dedication requests that a celebrity may receive through the system, that they are empowered to choose how many items they will sign within a given period of time, or a hard limit on the number of signings that they will conduct. In this way, the library of items to be signed may communicate with the Inventory Management component in order to ensure that the celebrity has agreed to provide a signature, and has not exceeded their maximum. Once a celebrity has completed their specified number of signings, the file may be deactivated from the Library component until such time as the celebrity chooses to conduct further signings.

19. As discussed previously in the section entitled recorded event, the celebrity or fan may choose to also receive a video recording of a dedication from the celebrity. This module ensures that the video dedication is linked with the associated digital dedication, ensuring that the proper video archive is sent to the proper purchaser, but also providing a method for that purchaser to access the system to retrieve another copy of the file at a later date should they require one.

Figure 7:
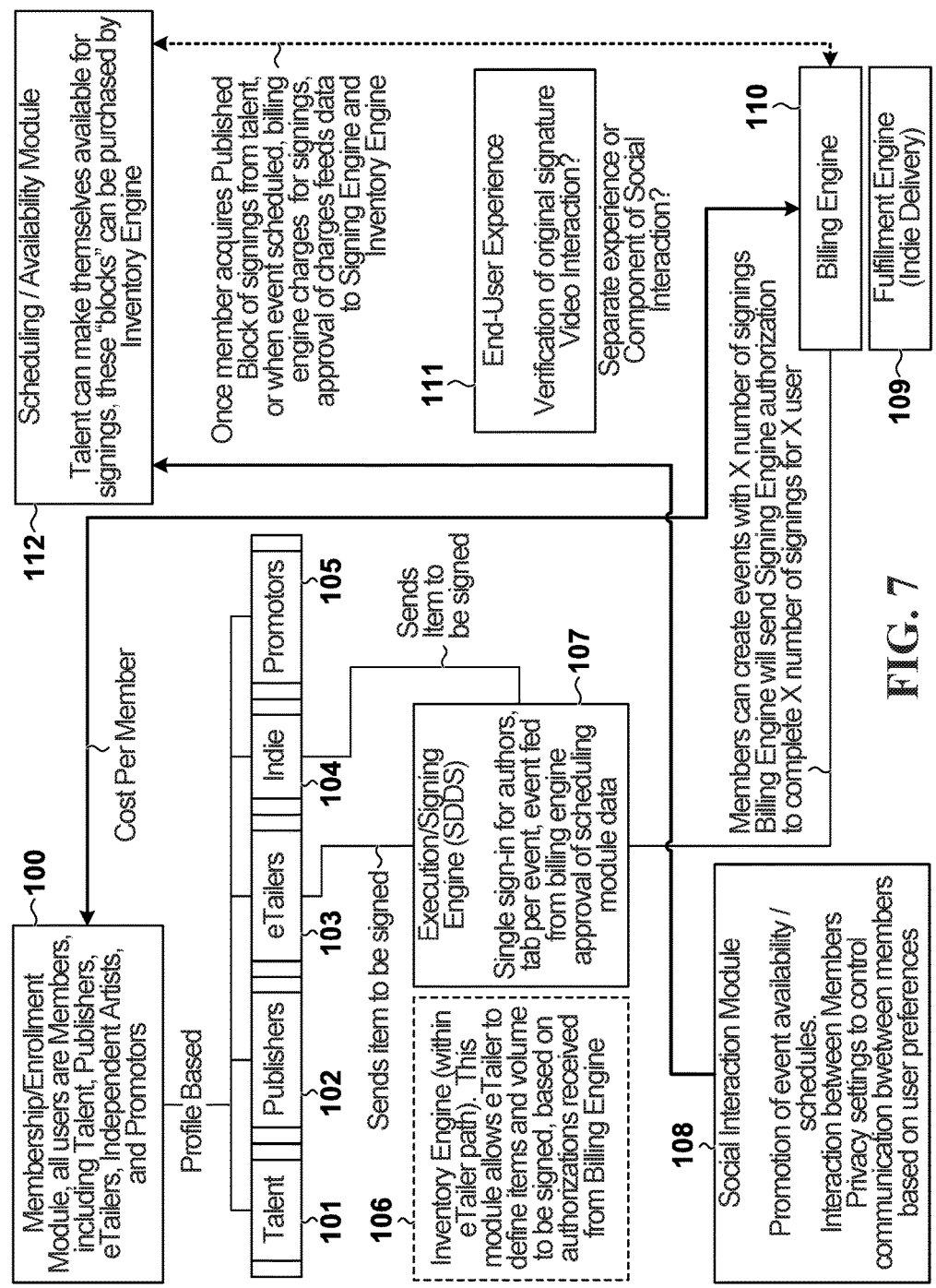
FIG. 7 is a further system diagram illustrating a particular embodiment of the system or platform of the present invention.

The present invention may be further explained by reference to FIG. 7. FIG. 7 illustrates a particular embodiment of a computer network implemented system in accordance with the present invention. An enrollment component (100) enables various stakeholders to enroll to the system, such as talent, publishers, eTailers, Indie participants or promoters. The enrollment component (100) requests relevant information from each stakeholder registering to the platform of the present invention. This information enables the platform to build a profile for each stakeholder and thereby enables the platform to customize content, features, and web presentation to the stakeholders, thereby enabling the platform to present for example a talent area (101), a publisher area (102), an eTailer area (103), an Indie area (104), and a promoter area (105).

An inventory engine (106) enables for example an eTailer to define the information objects and related information such as number of information objects, time for completion and so on. Talent may access a scheduling component (112) that enables the blocking of availability or the extracting from third party system of talent's scheduling data. The inventory engine (106) may enable the booking of talent for events enabled by the platform of the present invention, including optionally the "purchase" of blocks of time from talent by operation of the system.

Talent uses the SDDS (107) previously described to sign-in to the platform and perform signatures/dedications as requested. The social interaction module (108) enables social interactions as described earlier, including promotion of event availability and event schedules.

It should be understood that the platform may include a validation component to enable fans to verify that they have been provided an original signature. This may be provided by operation of the end-user experience component (111).

The platform may include a fulfillment engine (109) that enables the ordering and delivery of ancillary material such as for example band merchandise. A billing engine (110) enables processing of payments for a variety of platform functions including for example enrollment (subscription fees), payment of fees to talent, or purchase of merchandise or other products.

Sales of Signed/Dedicated Information Objects

A resale market in information objects is emerging. For example, it is contemplated that it will be possible to re-sell gift and lend e-books much as paper books can be resold, for example by facilitating the transfer to ensure that no additional copy is created as a result of the transfer from one person to another, likely by an operation for this purpose using the e-distribution platform. The present invention contemplates integration with such processes and e-distribution platforms in order to enable the transfer of ownership and validation of authenticity of information objects signed/dedicated by operation of the present invention. An important market for information objects signed/dedicated by particular celebrities will result, similar to the market that exists for signed/dedicated physical objects, where based on supply and demand certain signed/dedicated physical objects can increase in value. The present invention facilitates such a market in that it provides the ability to validate the authenticity of the signature/dedication, and that the item being transferred is the one and only original of the electronic file.

Revenue Models

It should be understood that an additional fee may be charged by the vendor for information objects signed/dedicated by operation of the invention. This may depend on the number of signed/dedicated information objects that will be made available, for example if a smaller number will be available then the extra fee may be higher. The fee may also depend on the celebrity. In either case, it is contemplated that the operator of the system of the invention will receive a share of the applicable revenue. An additional fee may be applied in the event of a request for validation of the authenticity of a particular information object. The system may facilitate the events described above, for which a fee may be charged to the celebrity, promoter, or vendor, as the case may be. In the event of the transfer of a signed/dedicated information object an additional fee may be applied. Additional revenue results from monetization of community interaction via Applicant's website, for example, by means of advertising revenue. To the extent that the present invention promotes the purchase of information objects by personalizing the information objects, revenue shearing will be implemented based on sales of signed/dedicated e-artifacts for example. Many other revenue models are possible such as annual talent/vendor/customer subscription fees.

Some Advantages of the Invention

The present technology enables:

2. Electronic distribution of information objects, while enabling the personalization of the information object by a celebrity.
3. Creates a new market for signed/dedicated information objects, along with monetization thereof.
4. Ability to conduct live or post-sale events efficiently, and in connection with information objects distributed electronically. This enables for example authors and other artists to promote their work directly, selling their digital content and running their own promotional events.
5. Removes barriers to adoption of electronic distribution of content including but not limited to entertainment content.
6. Ensures that information objects processed by this invention are "marked and authenticated" as being a sole and true original, which claim cannot be made today for other information objects.
7. Distinct advantages over for example traditional signings and meet and greets—namely provenance, video record, personal pre-introduction data to the talent and so on (without awkward whispers into the ear of the talent from handlers). The present invention leverages the efficiencies of a digital platform but with immediacy that would normally only be possible through a one-on-one visit between the fan and the celebrity.

Other variations and modifications of the invention are possible. It is possible that the system of the invention could be integrate with an e-distribution platform allowing creators to promote and sell their information object, including ones personalized using the present invention. The system of the invention may be extended to include various electronic tools for promoting and cross-promoting their information object creations. The present invention fosters community between the industry participants managing or working with the creators, i.e. Agents, Publicists, Labels, publishing houses, eTailers, etc, or in other words the industry social network that provides a means to communicate directly between themselves in the creation of events amongst the members. Events in this Industry Social Network can be created from scratch, customized, modified and made into event templates to smooth the creation of future vents. Community is also fostered between celebrities of various types and their fans, but also between fans, and using social networking further communities based can be created dynamically where creators with common interests and fans with common interests may congregate using leading social networking technologies and strategies including strategies for monetizing such participation and interaction.

The invention claimed is:

1. A computer network implemented method of applying a personalization to electronic objects, the method comprising:
   receiving or accessing, by a computer device, a queue of electronic objects associated with a user;
   determining, by the computer device, a recipient of an electronic object in the queue of electronic objects and accessing a profile data of the recipient in a database, wherein the profile data comprises a data item representing a historical interaction between the user and the recipient;
   displaying the historical interaction to the user in connection with an online event involving both the user and the recipient;
   displaying the profile data of the recipient to the user for generation of a signature or dedication associated with the electronic object;
   generating, by a signature utility, the signature or dedication based on input received from the user;
   applying the signature or dedication to the electronic object;
   generating a biometric record associated with the electronic object, for validation that the generated signature or dedication is associated with the user; and
   generating an encrypted unique identifier associated with the electronic object, for validation of the electronic object to which the generated signature or dedication is associated.

2. The method of claim 1, wherein the profile data comprises one or more data items representing personal information of the recipient.

3. The method of claim 2, further comprising:
   integrating the signature or dedication of the electronic object with audiovisual interactions between the user and the recipient so as to present a computer network implemented event.

4. The method of claim 3, further comprising:
   further integrating computer network implemented social media interactions with the recipient in connection with the computer network implemented event.

5. The method of claim 2, further comprising:
   enabling the recipient to order a physical version of the electronic object using an on-demand print service.

6. A computer network implemented system for applying a personalization to electronic objects, the system comprising:
   a computer device operable to capture an input of handwriting of a user, the computer device configured to:
      receive or access a queue of electronic objects associated with the user;
      determine a recipient of an electronic object in the queue of electronic objects and access a profile data of the recipient in a database, wherein the profile data comprises a data item representing a historical interaction between the user and the recipient;
      display the historical interaction to the user in connection with an online event involving both the user and the recipient;
      display the profile data of the recipient to the user for generation of a signature or dedication associated with the electronic object;
      receive the signature or dedication generated by a signature utility based on the input of handwriting received from the user;
      apply the signature or dedication to the electronic object;
      link the generated signature or dedication of the electronic object;
      generate a biometric record associated with the electronic object, for validation that the generated signature or dedication is associated with the user; and
      generate an encrypted unique identifier associated with the electronic object, for validation of the electronic object to which the generated signature or dedication is associated.

7. The system of claim 6, further comprising a server computer linked to one or more hardware utilities to enable computer network implemented audio-video interactions between the user and the recipient.

8. The system of claim 7, wherein the audio-video interactions are linked to the signature or dedication of the electronic object in connection with an online event.

9. The system of claim 8, wherein the system is operable to compile profile data for the recipient, and the system is further operable to present selected profile data to assist the user in interacting with the recipient in connection with the online event.

10. The system of claim 8, wherein the system further includes or is linked to a computer network implemented social media engine that is operable to enable social media connections and interactions with the recipient in connection with the online event.

11. The system of claim 8, wherein the system includes or is linked to an on demand printing system that is operable to print one or more products based on or associated with the electronic objects, wherein the system is operable to enable the recipient to order the one or more print products using an electronic commerce utility that is included in or linked to the system.

12. The system of claim 7, wherein the system includes or is linked to an activity logger that tracks and logs activities of the recipient so as to produce activity data for the recipient, and the system further includes or is linked to an analytics engine that is operable to analyze the activity data so as to generate analytics data that supports analytical queries or report generation based on the analytics data.

13. The system of claim 12, wherein the analytical queries or reports relate to trends associated with the electronic objects or one or more categories associated with the electronic objects that reveal trends associated with interest in or consumption of content, including based on demographic data or location data.

14. The method of claim 1, further comprising transmitting or making available the signed or dedicated electronic object to the recipient.

15. The system of claim 6, wherein the computer device is further configured to transmit or make available the signed or dedicated electronic object to the recipient.

16. The system of claim 7, wherein the computer implemented audio-video interactions further include one or more fans of the user.

17. The system of claim 16, wherein the system is further operable to compile profile data for the one or more fans.

18. The system of claim 16, wherein the system is further operable to enable social media connections and interactions between the one or more fans in connection with the online event.

19. The system of claim 16, wherein the system includes or is linked to an activity logger that tracks and logs activities of the one or more fans so as to produce activity data for the one or more fans.

20. The method of claim 3, wherein the computer network implemented event further includes one or more fans.

* * * * *